March 18, 1924.
W. O. BATES, JR
1,486,943
PERCOLATOR AND THE LIKE
Filed Feb. 21, 1923       2 Sheets-Sheet 1
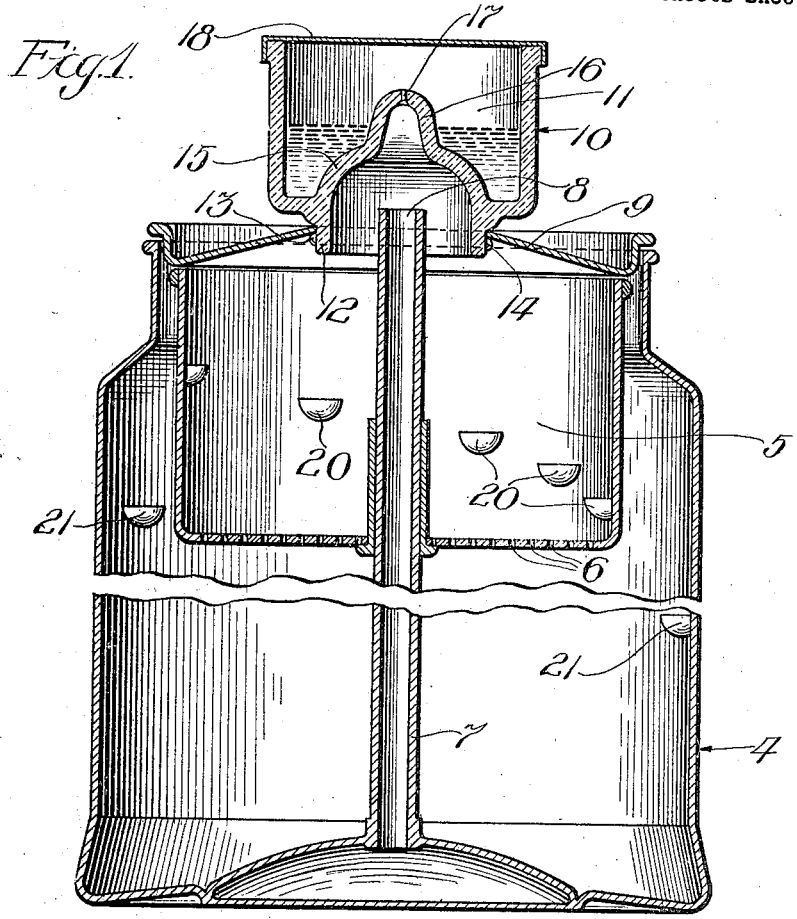
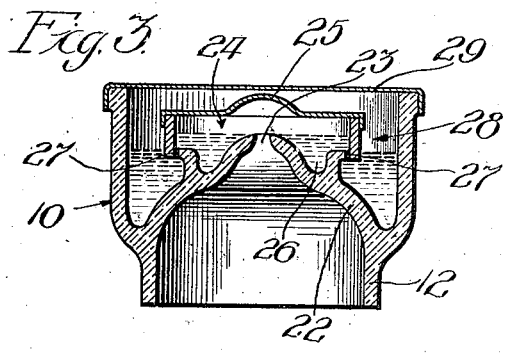 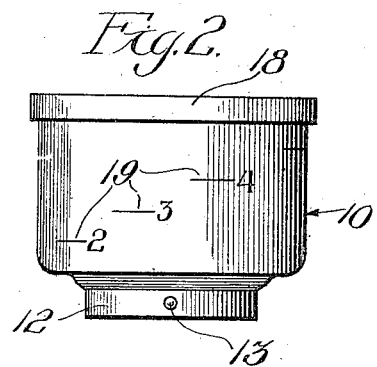
Inventor:
William O. Bates, Jr.
by Lanning & Lanning
Attys

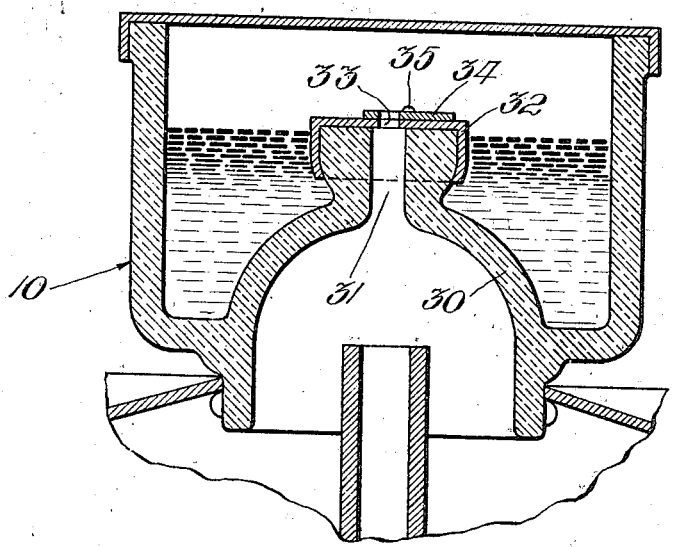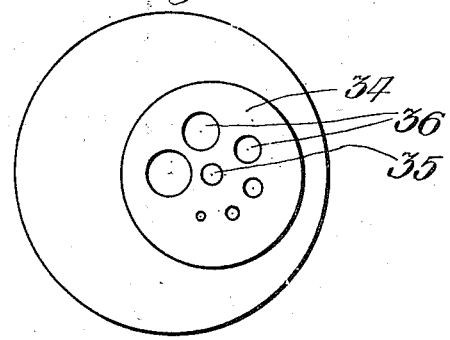

Patented Mar. 18, 1924.

1,486,943

UNITED STATES PATENT OFFICE.

WILLIAM O. BATES, JR., OF JOLIET, ILLINOIS.

PERCOLATOR AND THE LIKE.

Application filed February 21, 1923. Serial No. 620,351.

*To all whom it may concern:*

Be it known that I, WILLIAM O. BATES, Jr., a citizen of the United States, residing at Joliet, in the county of Will and State of Illinois, have invented certain new and useful Improvements in Percolators and the like, of which the following is a specification.

This invention has to do with certain improvements in percolators for making beverages such as coffee and the like. The main object of the invention is to provide a very simple and convenient arrangement for indicating to the user the approximate time during which the percolating action has progressed so that the user will be readily informed as to the completion of the percolating interval without the need of using a special instrument such as a watch or clock.

Another object in this connection is to provide this time measuring element in the form of an attachment which can be readily used in conjunction with percolators of familiar form such as are in use today, without having to reconstruct or reorganize the same to any material extent. In this connection a further object is to provide the time measuring device of such form and arrangement that it can be readily substituted in the place of the glass top which is familiarly used with the covers for percolators.

A further object in connection with the foregoing features is to make provision for indicating the proper time interval for the percolating action when different amounts of coffee and different amounts of water are used in the percolator. For example, if the proper amount of coffee and water is placed in the percolator to make three cups, the total time for making the beverage should be different from that proper for making five cups. It is, therefore, a further object of the invention to provide a time measuring device which is so calibrated that an indication will be given as to the proper time interval for the different amounts within the capacity of the percolator.

A further object is to provide a construction such that the device can be easily removed for replacement or repair or for cleaning purposes.

Other objects and uses of the invention will appear from a detailed description of the same, which consists in the features of construction and combinations of parts hereinafter described and claimed.

In the drawings:

Figure 1 shows a vertical section through a percolator provided with a top embodying the features of the present invention, the central portion of the pot being broken away so as to shorten up the figure;

Fig. 2 shows an elevation of the percolator top of Fig. 1;

Fig. 3 shows a vertical section through a modified form of top embodying the features of the present invention.

Fig. 4 shows a vertical section through another modified form of top; and

Fig. 5 shows a plan view of the form shown in Fig. 4.

The pot, in its entirety, is designated by the numeral 4. It is provided with the usual basket 5 which holds the coffee, and which basket is provided with the perforations 6 to allow the liquid to trickle back into the body of the pot. It is also provided with the gusher tube 7 leading from the lower portion of the pot to the discharge point 8 where the liquid is thrown out and finds its way down onto the coffee contained within the basket 5.

The percolator illustrated includes a cap 9 which can be set down to close the pot or the basket or both. This cap 9 is provided with a central opening into which is ordinarily set a glass top into which the liquid from the gusher tube is thrown, so that the user can watch the progress of the percolating action by watching the liquid thrown into this glass top.

In the present case I remove the glass top, just spoken of, and substitute in place therefor the element designated by the numeral 10. This is a modified form of glass top which includes a chamber 11 into which a small fraction of the liquid may be delivered and trapped, so that the elevation of the liquid in this chamber is a measure of the time interval during which the percolation has continued. This glass top includes the downwardly projecting flange 12 which reaches through the opening of the cap 9. This flange 12 is provided with a pair of side lugs 13 and 14 which may be set through notches in the sides of the opening of the cap 9, so that the top member 10 may then be turned through a quarter turn and thus locked in place.

The top 10 also includes a bell shaped partition 15, the central portion 16 of which is extended upwards and is provided with a perforation 17 through which a portion of the liquid may be projected and discharged into the chamber 11. The shape and size of the partition 15 and the opening 17 are such, with respect to the gusher tube, that only a small and predetermined portion of the liquid thrown up through the gusher tube will be allowed to enter the chamber 11 and be trapped therein. The great bulk of the liquid will be thrown back onto the coffee within the basket 5 in accordance with the usual percolating action.

A removable cap 18 is provided for the chamber 10 so that by removing said chamber from the cap 9 and then removing the cap 18 the liquid within the cap 10 can be either poured back into the pot 4 or thrown away. In any case, however, the percentage of liquid within the cap 10 as compared to the total within the pot is small and therefore the loss or interference with the percolating action is very small in amount. The cap 10 may be provided with a series of markings 19 located at different elevations, and provided with numerals corresponding to different quantities of beverage. For example, the markings 19 may be placed at the different elevations corresponding to the completion of the percolating action for two, three, four or five cups of coffee; and when the elevation of the liquid in the cap 10 reaches the proper mark, the operator will know that the percolating action is completed. If desired, the basket 5 may be provided with similar markings in the form of projections 20 located at different elevations corresponding to the correct amounts of coffee for different quantities of beverage; and in like manner the pot may be provided with projections 21 corresponding to the proper amounts of water to be placed in the pot for the same quantities of beverage. It will be understood, therefore, that the amount of water in the pot, the amount of coffee in the basket, and the indications on the top 10, are all properly co-ordinated, so that the operator is given a proper indication of the time interval for the percolating action in each case.

In the modified arrangement shown in Fig. 3, the top 10 is provided with a partition 22 which has a relatively large opening 23 through which a portion of the liquid is projected into an intermediate chamber 24 having a removable cap 25. This intermediate chamber 24 is so arranged that the elevation of the liquid therein cannot exceed a certain point, since thereafter the liquid will simply flow back through the opening 23 down into the basket 5. This arrangement is made possible by the depressed portion 26 around the chamber 24.

The floor of the chamber 24 is also provided with one or more relatively small openings 27 through which the liquid from the chamber 24 may trickle into an outer chamber 28 which is provided with a removable cap 29. The liquid trickling into the chamber 28 will be trapped therein, so that the elevation of this liquid will rise steadily with the lapse of time during the percolating action. The elevation of this liquid in the chamber 28 is of course a measure of the time interval, and suitable markings may be provided on the top 10 to designate the lapse of the proper time interval for different quantities of beverage.

When this form of the invention is used, the liquid ultimately remaining in the two chambers 24 and 28 may be either thrown away or returned to the pot as desired.

In the modified construction shown in Figs. 4 and 5, the top 10 is provided with a partition 30 having a relatively large opening 31. A metal cap 32 is spun over the top of the device above the opening 31, said cap having an opening 33 in register with the opening 31, but preferably of slightly smaller size.

A plate 34 is pivoted to the cap 32 at the point 35, said plate having a series of openings 36 of graduated size located in circular fashion around the pivot point and at the proper radius, so that by turning the plate one or the other of these openings can be brought into register with the opening of the cap. It is thus possible to adjust the size of the opening through which the trapped liquid will pass, and is thus possible to calibrate the device so as to make it read properly. This feature may in some cases be found of value, since the total time for the percolating action will depend somewhat upon such conditions as to the size of the perforations in the basket, etc.

While I have herein shown and described only certain embodiments of the features of my present invention, still I do not limit myself to the same except as I may do so in the claims.

I claim:

1. In a percolator the combination with the pot, basket, and gusher tube thereof, of a transparent glass top member located above and in immediate proximity to the upper discharge end of the gusher tube, said top member including a circular trap having an inverted cup shaped floor above the upper end of the gusher tube, said floor being provided at its upper extreme end with a perforation of relatively small size as compared to the gusher tube, whereby the major portion of the liquid delivered upwardly through the gusher tube against the partition is immediately diverted downwardly into the basket, and whereby a relatively small portion of said liquid passes through the perforation of the partition into the trap and is retained therein, substantially as described.

2. In a percolator the combination with the top, basket, and gusher tube thereof, of a transparent top member located above and in immediate proximity to the upper discharge end of the gusher tube, said top member including a trap, having an inverted cup shaped floor above the upper end of the gusher tube, said floor being provided with a perforation of relatively small size as compared to the gusher tube, whereby the major portion of the liquid delivered upwardly through the gusher tube against the partition is immediately diverted downwardly into the basket, and whereby a relatively small portion of said liquid passes through the perforation into the trap and is retained therein, substantially as described.

3. In a percolator the combination with the pot, basket, and gusher tube thereof, of a top member located above and in immediate proximity to the upper discharge end of the gusher tube, said top member including a trap having a floor located above the upper discharge end of the gusher tube, and there being a relatively small perforation leading into said trap, whereby the major portion of the liquid delivered upwardly through the gusher tube against the partition is immediately diverted downwardly into the basket, and whereby a relatively small portion of said liquid passes through the perforation into the trap and is retained therein, substantially as described.

4. In a percolator the combination with the pot, basket, and gusher tube thereof, of a top member located above in close proximity to the upper discharge end of the gusher tube and including a partition adapted to divert the major portion of the liquid delivered by the gusher tube directly back into the basket, and including a trap, together with a perforation in the partition communicating with the trap, whereby the major portion of the liquid delivered upwardly through the gusher tube is returned directly to the basket, and whereby a portion of the liquid passes through the perforation into the trap, substantially as described.

5. As a new article of manufacture a glass top for a percolator and the like, said glass top having an inverted cup shaped floor, a circular trap surrounding the central portion of said floor, and a perforation in the central upper portion of the floor permitting passage of liquid therethrough, substantially as described.

6. As a new article of manufacture a top for percolators and the like for the purpose specified including an inverted cup shaped floor, a trap chamber adjacent thereto, and a perforation in the upper central portion of the floor permitting transfer of liquid therethrough to the trap, substantially as described.

7. As a new article of manufacture a top for percolators and the like for the purpose specified including a floor, a circular trap above the same, and a perforation in the floor permitting transfer of liquid therethrough to the trap, substantially as described.

8. As a new article of manufacture a top for percolators and the like for the purpose specified including a trap on one side thereof, and a perforation in the floor permitting transfer of liquid therethrough to the trap, substantially as described.

WILLIAM O. BATES, Jr.